(12) United States Patent
Malizia-Hoyt et al.

(10) Patent No.: US 7,164,934 B2
(45) Date of Patent: Jan. 16, 2007

(54) MOBILE TELEPHONE HAVING VOICE RECORDING, PLAYBACK AND AUTOMATIC VOICE DIAL PAD

(75) Inventors: Anna A. Malizia-Hoyt, Frisco, TX (US); William H. Hoyt, Frisco, TX (US)

(73) Assignee: Hoyt Technologies, Inc., Houston, TX (US)

( * ) Notice: Subject to any disclaimer, the term of this patent is extended or adjusted under 35 U.S.C. 154(b) by 341 days.

(21) Appl. No.: 10/354,526

(22) Filed: Jan. 30, 2003

(65) Prior Publication Data

US 2004/0176138 A1 Sep. 9, 2004

(51) Int. Cl.
*H04B 1/38* (2006.01)
*H04M 1/00* (2006.01)

(52) U.S. Cl. .................. 455/563; 455/412.1; 455/564; 455/556.1; 379/88.01; 379/88.02; 379/88.03

(58) Field of Classification Search ............. 455/412.1, 455/563, 564, 556.1; 379/88.01–88.03
See application file for complete search history.

(56) References Cited

U.S. PATENT DOCUMENTS

| | | | | |
|---|---|---|---|---|
| 5,572,575 A | * | 11/1996 | Yamamoto et al. | 455/412.1 |
| 5,651,056 A | * | 7/1997 | Eting et al. | 379/88.01 |
| 5,659,597 A | | 8/1997 | Bareis et al. | 455/563 |
| 5,790,957 A | | 8/1998 | Heidari | 455/553 |
| 5,867,793 A | | 2/1999 | Davis | 455/556 |
| 5,995,824 A | * | 11/1999 | Whitfield | 455/412.1 |
| 6,222,909 B1 | * | 4/2001 | Qua et al. | 379/88.22 |
| 6,260,012 B1 | | 7/2001 | Park | 704/236 |
| 6,370,237 B1 | * | 4/2002 | Schier | 379/88.03 |
| 6,580,903 B1 | * | 6/2003 | Hein et al. | 455/412.1 |
| 6,697,484 B1 | * | 2/2004 | Fleming, III | 379/354 |
| 6,744,860 B1 | * | 6/2004 | Schrage | 379/88.03 |
| 2001/0000505 A1 | * | 4/2001 | Segal et al. | 455/405 |
| 2002/0076195 A1 | | 6/2002 | Nakajima et al. | 386/46 |
| 2002/0160751 A1 | | 10/2002 | Sun et al. | 455/412 |
| 2003/0099367 A1 | * | 5/2003 | Okamura | 381/77 |
| 2003/0190020 A1 | * | 10/2003 | Kitchings | 379/88.01 |
| 2004/0063475 A1 | * | 4/2004 | Weng | 455/575.6 |
| 2005/0034079 A1 | * | 2/2005 | Gunasekar et al. | 715/753 |

* cited by examiner

*Primary Examiner*—Matthew D. Anderson
*Assistant Examiner*—Sujatha Sharma
(74) *Attorney, Agent, or Firm*—Michael L. Diaz

(57) ABSTRACT

A mobile phone which incorporates an audio recorder to record a telephone number and a voice recognition system for converting the recorded telephone number into a dialing command. The mobile phone includes a transmitter/receiver unit for transmitting and receiving voice signals within a radio telecommunications network. The mobile phone also includes an audio recorder for recording audio messages from a user of the mobile phone. The recorded audio messages are preferably telephone numbers which are converted by a voice recognition system into dialing commands.

12 Claims, 4 Drawing Sheets

MOBILE TELEPHONE HAVING VOICE RECORDING, PLAYBACK AND AUTOMATIC VOICE DIAL PAD

BACKGROUND OF THE INVENTION

1. Technical Field of the Invention

This invention relates to mobile phones, and more particularly, to a recording device incorporated within a mobile phone combined with playback and voice recognition dialing features for the purpose of dialing a voice recorded telephone number.

2. Description of Related Art

The use of mobile phones has increased tremendously over the past few years. Today, one can observe many people communicating on their mobile phones while engaging in different types of activities. Driving is one such activity. Frequently, the driver is trying to write down a needed phone number while operating the moving vehicle. The distractions associated with looking for pen/paper, taking down the number, etc. are dangerous. Recent studies suggest an increase in accidents attributed to increased mobile phone usage while driving.

In addition to driving, there are numerous other situations where access to pen/paper or the ability to physically write down a phone number is not feasible. Such activities may include outdoor activities (i.e., visiting a park, hiking, golfing), traveling, shopping or caring for a child, etc. A mobile phone is needed which enables a mobile phone user to record a phone number in a safe and convenient manner while enabling the mobile phone user to playback and call the recorded telephone number without manually dialing.

Although there are no known prior art teachings of an apparatus or system such as that disclosed herein, prior art references that discuss subject matter that bears some relation to matters discussed herein are U.S. Pat. No. 5,659,597 to Bareis et al. (Bareis), U.S. Pat. No. 5,790,957 to Heidari (Heidari), U.S. Pat. No. 6,260,012 to Park (Park), and U.S. Patent Application Publication Number U.S. 2002/010751 to Sun et al. (Sun).

Bareis discloses a telecommunications system which recognizes spoken commands over a cellular telephone. A speech recognition system is interconnected either internally or externally to a cellular telecommunications switch. The speech recognition system includes a call processing subsystem, a speaker-dependent recognition subsystem, a speaker-independent recognition subsystem and a data storage subsystem. The speech recognition system is integrated within a switch or switches as a shared resource. However, although Bareis discloses a voice recognition system for use within a mobile phone, Bareis does not teach or suggest incorporating a voice recorder with a voice recognition system to dial a recorded phone number.

Heidari discloses a cellular telephone having transmit and receiver channels with a digital mode communication capability having a memory and switching circuitry operative under control of a micro-controller. By entry of commands to the micro-controller, the micro-controller arranges the configuration of the switching circuitry to permit storage in the memory of a message originating locally from a user of the telephone. The message is inputted via a microphone connected to the transmitted channel or from a distant telephone connected via a communication link to the receiving channel. Subsequent playback of the message from the memory may be coupled via the switching circuitry from the memory and may be coupled via the switching circuitry to a speaker of the telephone to be heard by a user of the telephone or may be outputted to the transmitted channel for communication to the distant telephone. However, Heidari does not teach or suggest utilizing the recorded message with a speech recognition to enable the dialing of a recorded number.

Park discloses an apparatus for performing improved speech recognition in a mobile phone which allows hands-free voice dialing. In a speech recognition mode, a user's input speech such as a desired called party name or number is converted to feature data and compared to individually pre-stored feature data sets corresponding to pre-recorded speech obtained during a registration process. The apparatus matches the stored speech with the received inputted speech and automatically performs a dialing operation. However, Park does not teach or suggest a mobile phone which records a received phone number and automatically dials the recorded number.

Sun discloses a mobile phone having a voice recording feature. The mobile phone has a telephonic capability enabling the user to make/receive a call while in motion and a recording mechanism integrated within the mobile device which records an audio input from a user. Sun does not teach or suggest utilizing a recording mechanism in conjunction with a speech recognition system to enable the user to record a telephone number and automatically dial the recorded number.

There are numerous mobile phones which have voice recognition systems enabling a user to voice dial a desired number. Additionally, there are several mobile phones which incorporate a voice recorder in the phone to record a message by the user for later playback. However, review of the foregoing references reveals no disclosure or suggestion of a mobile phone which utilizes a voice recorder in conjunction with a voice recognition system to enable a user to record a telephone number and playback the recorded number for voice dialing of the recorded number. It is an object of the present invention to provide such an apparatus and method.

SUMMARY OF THE INVENTION

In one aspect, the present invention is a mobile phone for use within a radio telecommunications network. The mobile phone includes a transmitter/receiver unit for transmission and reception of voice signals within the radio telecommunications network and an audio recorder for recording audio messages from a user of the mobile phone. The mobile phone also includes a memory unit for storing audio messages and a voice recognition system for converting the stored audio message into a dialing command on the mobile phone. The user verbally inputs a telephone number into the audio recorder for storage within the memory unit. The stored telephone number automatically is converted by the voice recognition system into a dial command to dial the stored telephone number on the mobile phone.

In another aspect, the present invention is a mobile phone for use within a radio telecommunications network. The mobile phone transmits and receives voice signals within the radio telecommunications network. The mobile phone also may record a telephone number verbally inputted by a user of the mobile phone. The mobile phone recognizes the recorded telephone numbers verbally inputted by the user and converts the recognized numbers into dialing commands.

In still another aspect, the present invention is a method of recording a telephone number and dialing the recorded number on a mobile phone within a radio telecommunications network. The method begins by a user receiving a telephone number. Next, the telephone number is recorded in an audio recorder within the mobile phone. The recorded telephone number is played as desired by the user. Upon playback of the telephone number, a voice recognition system recognizes the played numbers of the telephone number and converts the recognized numbers into dialing commands on the mobile phone.

BRIEF DESCRIPTION OF THE DRAWINGS

The invention will be better understood and its numerous objects and advantages will become more apparent to those skilled in the art by reference to the following drawings, in conjunction with the accompanying specification, in which.

DETAILED DESCRIPTION OF EMBODIMENTS

Figure 1:
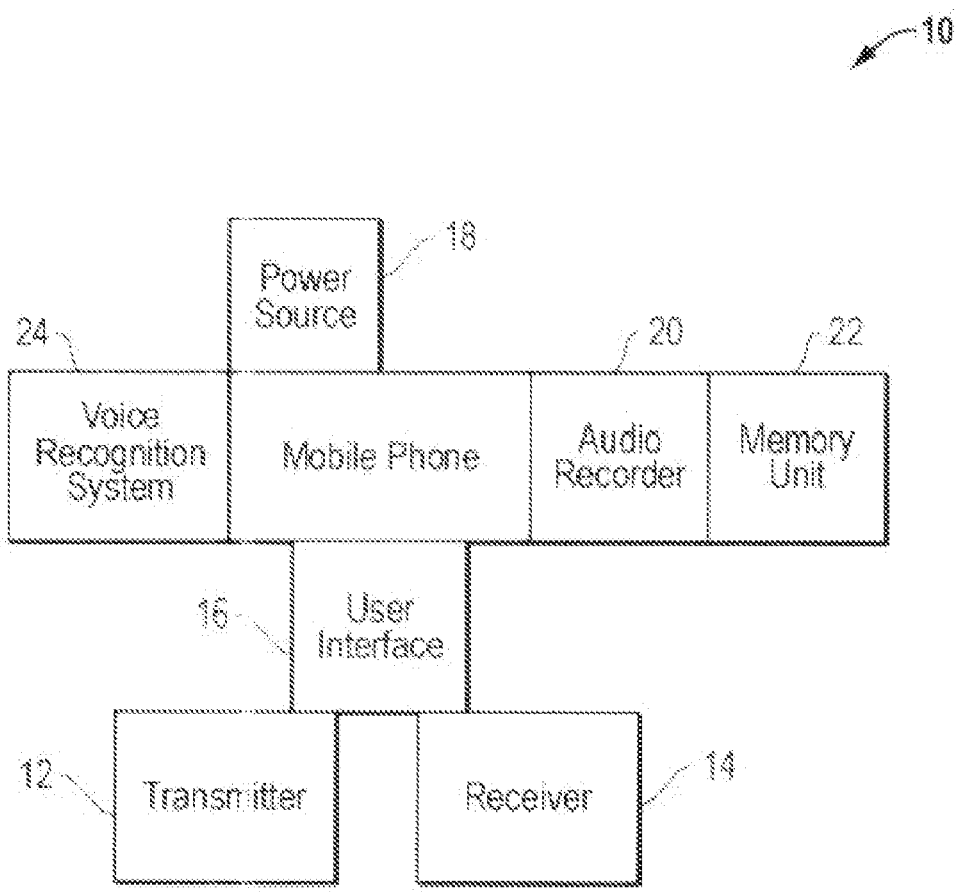
FIG. 1 is a simplified block diagram illustrating the components of a mobile phone in the preferred embodiment of the present invention.

A mobile communication device having a voice recording mechanism working in conjunction with a voice recognition system is disclosed. FIG. 1 is a simplified block diagram illustrating the components of a mobile phone 10 in the preferred embodiment of the present invention. The mobile phone includes a transmitter 12, a receiver 14, a user interface 16, a power source 18, an audio recorder 20, a memory unit 22, and a voice recognition system 24.

The mobile phone 10 may be any mobile communications device, such as a mobile phone or a wireless personal data assistance. The mobile phone operates in a conventional manner well known to those skilled in the art of radio telecommunications in that a user may operate the mobile phone to communicate with another through a radio telecommunications network 30. The transmitter 12 transmits audio and data messages while the receiver 14 receives messages via the radio telecommunications network. The power source 18 is any power source providing power to the mobile phone, such as a battery or an AC adapter connected to a conventional plug outlet. The user interface 16 may be any interface enabling a user 32 to operate the mobile phone. Typically, the user interface includes a numeric pad, an execute button and a disconnect button. In addition, in the preferred embodiment of the present invention, the interface includes a record button. Depression of the record button mutes any incoming voice communications received via the mobile phone and records an audio message from the user. The audio message is stored within the memory unit 22.

The mobile phone 10 utilizes the voice recognition system 24 to convert the audio playback message (i.e., telephone number) recorded by the user 32 into numeric signals which are used for enabling the mobile phone to automatically dial the recorded number through the radio telecommunications network 30.

Figure 2:
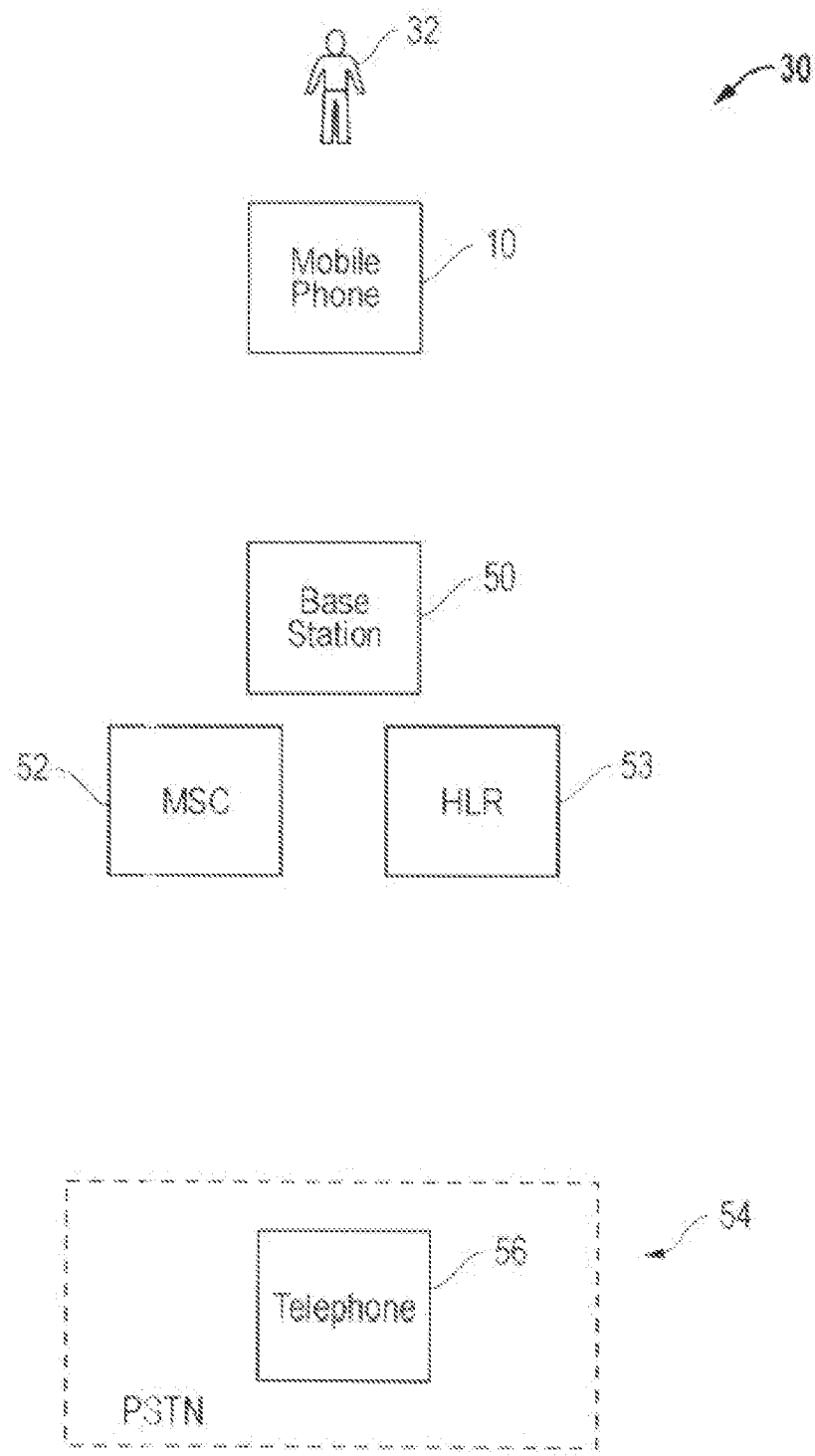
FIG. 2 is a simplified block diagram of the radio telecommunications network utilized by the mobile phone.

FIG. 2 is a simplified block diagram of the radio telecommunications network 30 utilized by the mobile phone 10. The radio telecommunications network includes at least one mobile phone 10 communicating with another phone, either another mobile phone or a landline phone. The mobile phone transmits and receives messages from a base station 50. The messages received by the base station are handled by an associated mobile switching center (MSC) 52. Additionally, a home location register (HLR) 53 is also communicating with the MSC providing a storage database for the MSC. The utilization of the MSC and HLR within a radio telecommunications network is well known to those skilled in the art of radio telecommunications. Voice and data messages may be sent and received to other mobile phones located within the radio telecommunications network or through a public switch telecommunication network (PSTN) 54 to a landline phone 56. It should be understood that FIG. 2 is merely illustrative of simplified exemplary radio telecommunications network and the number, names and functions may vary within the radio telecommunications network.

Figure 3:
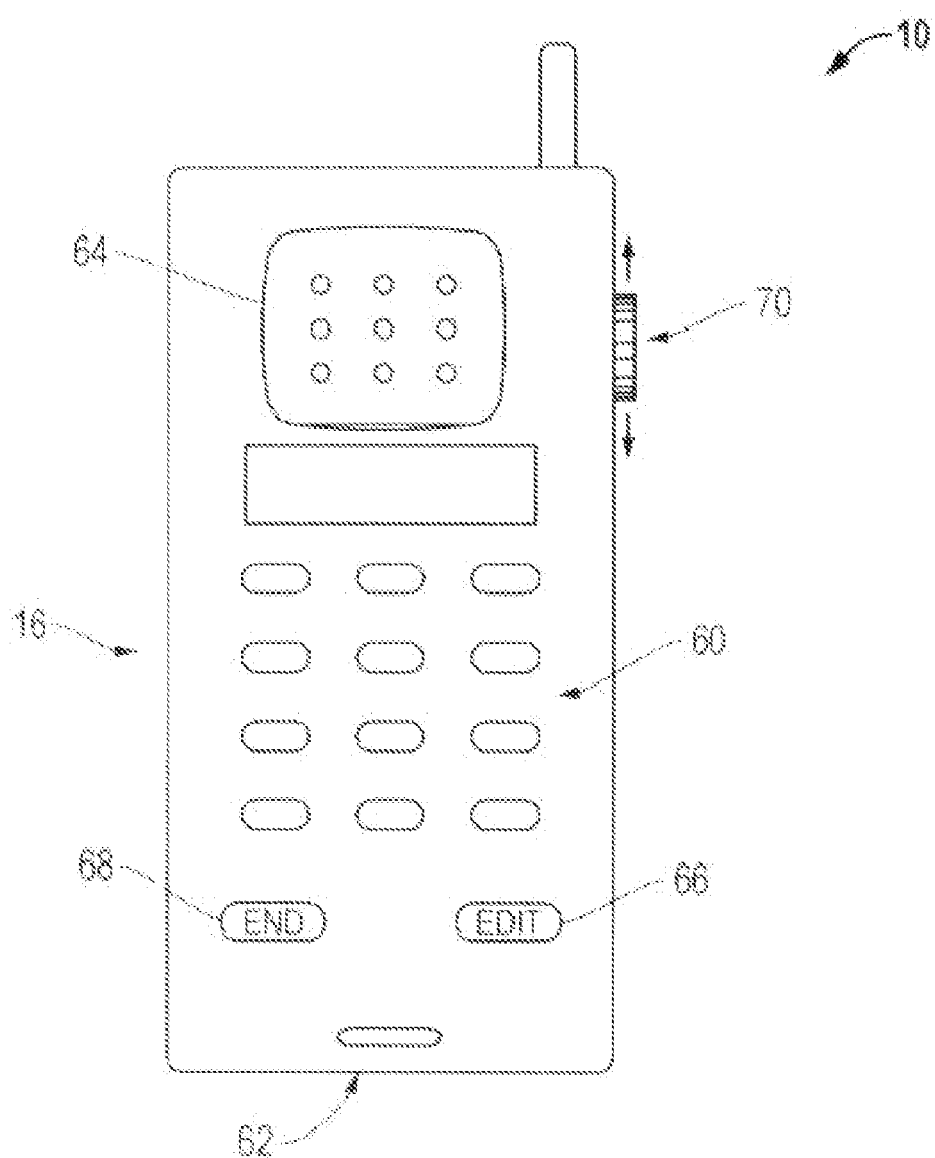
FIG. 3 is a front view of the mobile phone illustrating the user interface.

FIG. 3 is a front view of the mobile phone 10 illustrating the user interface 16. The user interface includes a numeric pad 60, a microphone 62, a speaker 64, an execute button 66 and a disconnect button 68. All of these components of the interface are normally present in a conventional mobile phone. The mobile phone also includes a recorder toggle switch 70. The switch may be toggled to the upward position to start the recording function of the audio recorder 20. The switch may also be toggled to the downward position to playback a recorded message. The toggle switch may be spring-loaded to the center position where the recorder is stopped (either in playback or recording mode). It should be understood that FIG. 3 is illustrative of the mobile phone 10. The mobile phone may take any shape or configuration which allows the recording of audio messages as well as the playback of the messages.

With reference to FIGS. 1–3, the operation of the mobile phone 10 will now be explained. The user 32 may be talking on the mobile phone and desire to record a telephone number. The user may receive the number from a called party the user is speaking with on the phone or visually from another source, such as a piece of paper. To record a message within the audio recorder 20, the user presses the recorder switch upward to the record mode. During the record mode, the audio recorder records the telephone number from the user. In addition, in the preferred embodiment of the present invention, the audio recorder may optionally mute any other sounds received by the mobile phone. For example, the user may receive the telephone number from the called party. The user merely repeats the number the user hears into the mobile phone, while in the recording mode. The audio message is recorded and stored within the memory unit 22. When desired, the user may wish to call the recorded telephone number to speak with the party associated with the recorded number. The user toggles the recorder switch 70 to the playback mode. During playback of the audio message, the voice recognition system 24 receives the audio message and attempts to recognize the numbers within the recorded message. Upon recognition of the numbers, the voice recognition system automatically or optionally manually at the user's command dials the recognized numbers. Thus, the mobile phone automatically dials the playback of the recorded audio message. The voice recognition system may require an initial registration of the user's voice to assist in recognizing the voice messages from the user.

Figure 4:
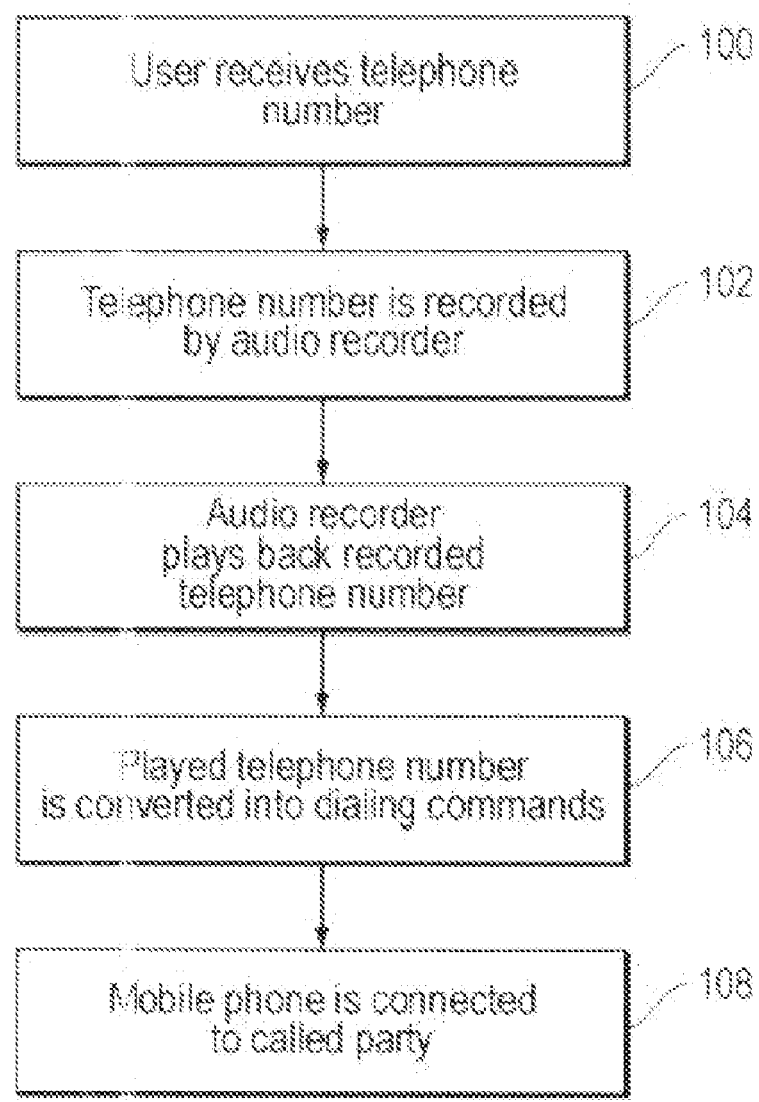
FIG. 4 is a flow chart outlining the steps for recording a telephone number and automatically dialing the recorded number according to the teachings of the present invention.

FIG. 4 is a flow chart outlining the steps for recording a telephone number and automatically dialing the recorded number according to the teachings of the present invention. With reference to FIGS. 1–4, the steps of the method will now be explained. The method begins with step 100 where the user 32 of the mobile phone 10 receives a telephone number. The receipt of the telephone number may be verbally received from another calling party on the mobile phone or another party. In addition, the telephone number may be received from a visual source, such as a textual message on a piece of paper or a billboard. Next, in step 102, the user records the telephone number by actuating the recorder switch 70 to the record mode on the audio recorder 20 and verbally repeating the telephone number. The audio recorder may optionally mute any other sounds other than from the user. The recorded telephone number is stored in the memory unit 22. The method then moves to step 104 where, when desired by the user, the recorder switch 70 is actuated to the playback mode. The audio recorder then plays the recorded telephone number. In step 106, the played telephone number is converted by the voice recognition system 24 into dialing commands. The voice recognition system converts the recorded telephone numbers into numeric dialing commands. Next, in step 108, the mobile phone is connected to the dialed number.

In an alternate embodiment of the present invention, the mobile phone may be configured in a "hands-free" configuration in which an external microphone is connected via a wire or wireless connection to the mobile phone. Additionally, a toggle switch may be located on the wire for activation of the recorder. The audio recorder 20 may be located within the mobile phone or external of the mobile phone. In another alternate embodiment of the present invention, the audio recorder 20 or the memory unit 22 may be located with the MSC 52 or the HLR 53. In this configuration, a separate voice or data channel is utilized to send the received telephone for storage within the HLR or MSC. When desired, the stored number is played back through a voice channel to the mobile phone for voice recognition and voice dialing.

The present invention provides many advantages over existing mobile phones. The present invention enables a mobile phone user to store phone numbers in an audio format as well as automatically dialing the recorded phone number of the stored number. The present invention allows hands-free recording of telephone numbers as well as hands-free dialing. The attention of the mobile phone user is not distracted by writing information on a piece of paper. The present invention enhances safety by allowing the mobile phone user to maintain most of his attention on other tasks while recording a telephone number and automatically dialing the number as desired.

It is thus believed that the operation and construction of the present invention will be apparent from the foregoing description. While the apparatus and system shown and described has been characterized as being preferred, it will be readily apparent that various changes and modifications could be made therein without departing from the scope of the invention as defined in the following claims.

What is claimed is:

1. A mobile phone for use within a radio telecommunications network, the mobile phone comprising:
   a transmitter/receiver unit for transmission and reception of voice signals within the radio telecommunications network;
   an audio recorder for recording audio messages from a user of the mobile phone;
   a memory unit for storing audio messages; and
   a voice recognition system for converting the stored audio message into a dialing command on the mobile phone;
   wherein said audio recorder automatically mutes any verbal signals from any other party except the user;
   whereby the user verbally inputs a telephone number into said audio recorder for storage within said memory unit, the stored telephone number automatically being converted by said voice recognition system into a dial command to dial the stored telephone number on the mobile phone.

2. The mobile phone of claim 1 wherein the mobile phone includes activation switch for dialing the stored telephone on the mobile phone.

3. The mobile phone of claim 1 wherein said audio recorder may record an audio recording while user is communicating with another party on the mobile phone.

4. The mobile phone of claim 1 wherein said memory unit is externally located from the mobile phone.

5. The mobile phone of claim 4 wherein said memory unit is located within a home location register (HLR).

6. The mobile phone of claim 1 wherein the mobile phone includes an external microphone for hands free operation of the mobile phone and said audio recorder records audio messages from the user through the external microphone.

7. The mobile phone of claim 6 wherein the external microphone is connected to the mobile phone by a wire and a toggle switch is located on the wire, the toggle switch providing activation of the audio recorder while muting all verbal signals from any other party except the user and providing dialing activation of the stored audio message.

8. The mobile phone of claim 1 wherein said audio recorder automatically mutes verbal signals from all parties except the user in a conference call.

9. The mobile phone of claim 1 wherein said audio recorder may record an audio recording while the user is communicating with one or more parties an a conference call on the mobile phone.

10. A mobile phone for use within a radio telecommunications network, the mobile phone comprising:
    means for transmitting and receiving voice signals within the radio telecommunications network;
    means for recording a telephone number, the telephone number being inputting verbally by a user of the mobile phone; and
    means for recognizing the recorded telephone number and converting the recognized number into numeric dialing commands;
    wherein the mobile phone records only verbal numbers input by the user while muting any other inputs from other parties;
    whereby the user verbally inputs a telephone number into the mobile phone which is converted into a dialing command.

11. The mobile phone of claim 10 wherein the mobile phone includes an external microphone for hands free operation of the mobile phone and wherein the telephone number is inputted verbally by the user through the external microphone.

12. A method of recording a telephone number and dialing the recorded number on a mobile phone within a radio telecommunications network, said method comprising the steps of:
    receiving a telephone number by a user of the mobile phone;
    recording the received telephone number into an audio recorder within the mobile phone; wherein the audio recorder mutes any other sounds not originating from the user through the mobile phone;
    playing the recorded telephone number;
    recognizing by a voice recognition system within the mobile phone numbers from the played telephone number; and
    converting the recognized numbers into dialing commands on the mobile phone.

\* \* \* \* \*